United States Patent Office 2,953,521
Patented Sept. 20, 1960

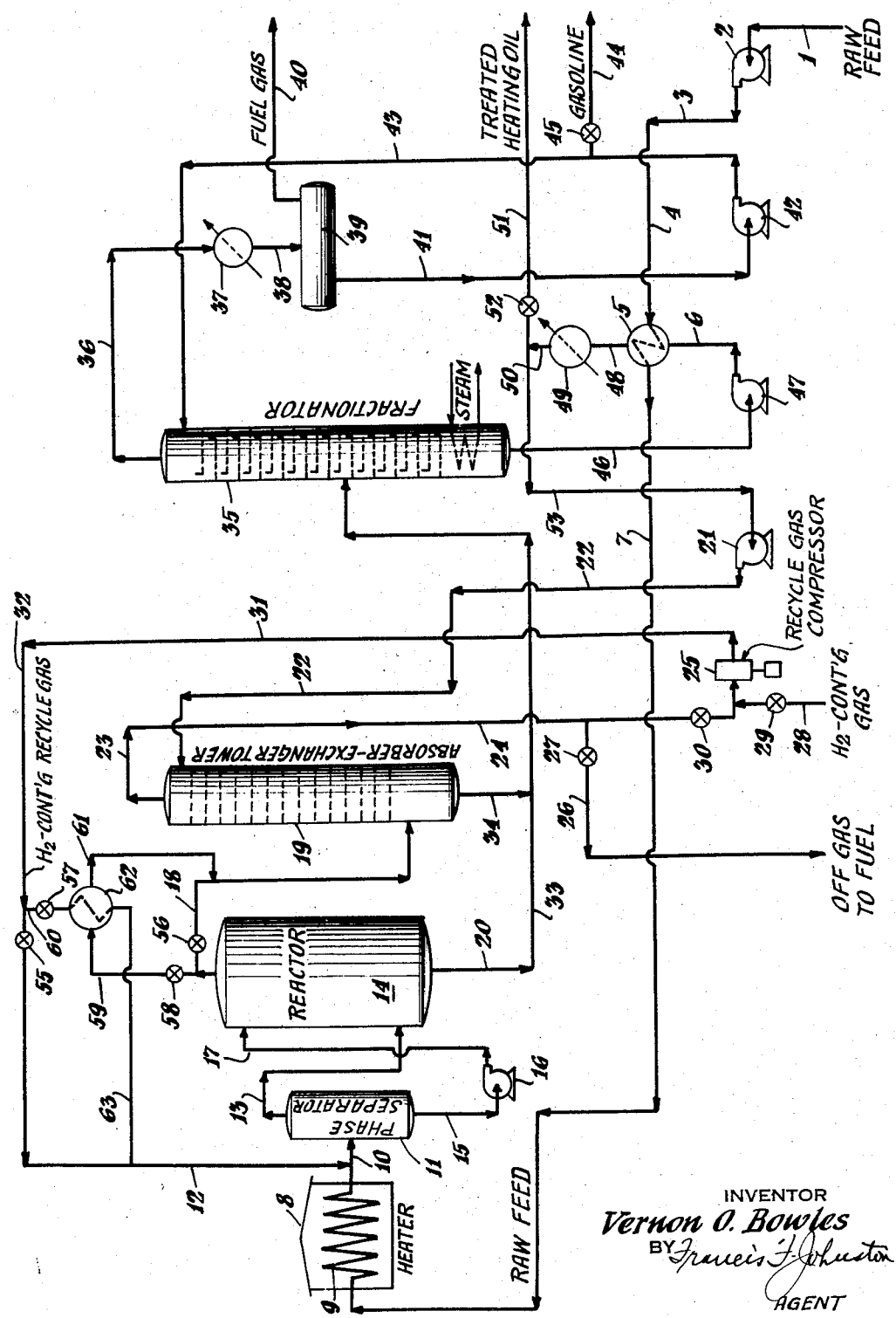

2,953,521
LIQUID-LIQUID HEAT EXCHANGE IN MIXED PHASE HYDROCARBON CONVERSIONS

Vernon O. Bowles, Rye, N.Y., assignor to Socony Mobil Oil Company, Inc., a corporation of New York Filed Mar. 18, 1957, Ser. No. 646,905

4 Claims. (Cl. 208—212)

The present invention relates to mixed phase hydrocarbon conversions and, more particularly, to a method of mixed phase hydrocarbon conversions whereby thermal and other economies are obtained.

Hydrocarbon conversions in which the reaction takes place in the presence of a bed of catalyst with part or all of one reactant in the vapor phase and part or all of another reactant in the liquid phase are becoming of increasing importance as the petroleum industry turns more and more to hydrocarbon conversions in which a hydrogen-containing gas is essential to the success of practical operations. Thus, for example, until reforming of naphthas made hydrogen-containing gas available for other refining operations distillate heating oil was usually refined by caustic and/or acid treatment, etc. Today with hydrogen-containing gas available in the volume required, the industry is now treating distillate heating oils with the by-product hydrogen to remove sulfur compounds and/or to raise the "diesel index" and/or to reduce the formation of sediment and/or color. However, the catalytic hydrodesulfurization of such a relatively cheap refinery product as domestic heating oil, i.e., distillate heating oil, must be achieved at minimum costs. Important among the cost factors are the operation of the compressors for the hydrogen-containing recycle gas, the costs of heating the oil and gas to reaction temperature, and similar operating costs.

Reactor temperatures of the order of 700° F. and above at pressures of 300 p.s.i. and above are usually required for feed stocks which are completely vaporized at atmospheric pressure and 600° F. and have dew points of 750° F., 820° F. and 850° F. respectively, for pressures of 50, 100 and 150 p.s.i.g. A distillate heating oil having a dew point of 850° F. at 150 p.s.i.g. when mixed with hydrogen-containing gas in the molar ratio of 1 to 4 mols of gas per mol of oil will be primarily, i.e., 50–95 percent in the liquid phase at pressures of 500 p.s.i.g. or more in the temperature range 650–800° F.

Thermal efficiencies of heat exchangers for indirect heat exchange between a liquid and a mixed phase medium are relatively low compared to heat exchanger devices for exchanging heat between a vapor and a liquid by direct contact. Yet, if practical costs of treating distillate fuel oils with hydrogen-containing gas in the presence of a bed of particle-form solid catalyst are to be achieved, heat exchange between the mixed phase reactor effluent and the liquid phase feed must be accomplished effectively and efficiently.

Furthermore, it is almost axiomatic that the lower the temperature of a gas to be pumped through a system the smaller the compressor required to handle a given volume of gas or of one of the components therein, e.g., hydrogen.

Accordingly, the present invention provides a means for hydrocarbon conversion wherein the conversion takes place in mixed phase; part of the hydrocarbon reactant being in the liquid phase and part of the hydrocarbon reactant and the hydrogen-containing gas being in the vapor phase. The present invention also provides for direct heat exchange between the gas phase of the reactor effluent and a liquid heat transfer medium which medium having been heated as the gas phase is cooled, joins with the liquid phase of the reactor effluent and comes into indirect liquid-liquid heat exchange with the raw feed.

By heat exchange directly between the gas phase of the reactor effluent and the liquid heat transfer medium, the low boiling constituents of the gas phase of the reactor effluent are absorbed by the liquid heat transfer medium and hydrogen-rich recycle gas cooled to below 250° F. and preferably below 150° F. is derived thereby with resultant smaller compressor requirement for recycling the hydrogen-rich gas to the reactor.

By indirect liquid-liquid heat exchange of the liquid heat transfer medium and the liquid phase of the reactor effluent with the raw feed, improved heat exchange efficiency is obtained and it is unnecessary to heat the recycle gas completely to reaction temperature. Thus, said recycle gas can be recycled directly to the reactor or mixed with the heated raw feed upstream of the reactor either with or without separate indirect heat exchange.

Illustrative of hydrocarbon conversions in the presence of a body of particle-form solid catalytic material in which at least a major part of at least one reactant is in the liquid phase and all or a major portion of another reactant is in the vapor phase are hydrodesulfurization and/or hydrogenation of distillate heating oils, hydrotreating of lubricating oil stocks, and hydrocracking of gas oils, topped crudes or residual oils. For the purpose of illustrating the present invention, the hydrodesulfurization of distillate heating oil will be described.

Distillate heating oil is a petroleum fraction having an initial boiling point of about 400° F., a 10 percent point of about 440° F., a 90 percent point of about 625° F., and a final boiling point of about 675° F. Such a typical heating oil at atmospheric pressure is completely vaporized at 600° F., while at 50 p.s.i.g. its dew point will be about 750° F.; at 100 p.s.i.g. its dew point will be about 820° F.; and at 150 p.s.i.g. its dew point will be about 850° F. When contacted with hydrogen at the molar ratio of about 1 to 4 mols of hydrogen per mol of oil only a small amount of the feed will vaporize at pressures of 650–850 p.s.i.g. or more in the temperature range 650° to 800° F. Consequently, a major portion, if not all, of the heating oil will be in the liquid phase while the recycle gas is in the vapor phase when hydrodesulfurizing distillate heating oil at pressures of 500 p.s.i.g. or more and temperatures of about 650° to 800° F. Thus, the reaction is a mixed phase reaction catalyzed by particle-form solid desulfurizing catalyst. Furthermore, at temperatures of 650° to 800° F., and particularly with some desulfurizing catalysts, there will be some cracking of the heating oil charge to lower boiling hydrocarbons. Consequently, the reactor effluent is partly in the vapor phase and partly in the liquid phase. In accordance with the principles of the present invention, the difficulties arising from the foregoing are overcome in the manner illustrated in the flowsheet of the drawing.

In the drawing raw distillate heating oil to be desulfurized is drawn from a source not shown through line 1 by pump 2. Pump 2 discharges into line 3 at about 800 p.s.i.g. and about 100° F. The raw oil flows through line 4 to heat exchanger 5 where the raw oil is in indirect heat exchange relation with treated heating oil flowing in line 6. The temperature of the raw oil is raised to about 640° F. by indirect heating with the hot treated oil in exchanger 5. From heat exchanger 5 the heated raw oil flows through line 7 to heater 8. The temperature of the raw oil is raised from about 640° F. to about 750°–800° F. in coil 9 of heater 8.

The heated oil flows from coil 9 through line 10 to phase separator 11. It is preferred to introduce hydrogen-containing recycle gas through line 12 into line 10 in the proportion of about 1 to 4 mols of hydrogen per mol of raw oil. The hydrogen-rich recycle gas can be delivered to line 10 through line 12 directly from compressor 25 or it may be delivered to line 10 after having been heat exchanged in indirect relationship to about 500° F. with the vapor phase reactor effluent material flowing in line 18. Thus, the recycle gas wholly or in part flowing through line 31 is diverted to line 60 by closing valve 55 and opening valve 57. The vapor phase reactor effluent flowing through line 18 is diverted to line 59 by closing valve 56 and opening valve 58. As a result, the vapor phase reactor effluent flows through line 59 to heat exchanger 62 and thence through line 61 to line 18 and tower 19. The recycle gas flows through line 60 to heat exchanger 62 and then through line 63 to line 12.

In phase separator 11 those constituents of the raw heating oil which are volatile at about 750° F., for example, and the total and partial pressure conditions prevailing separate from the higher boiling constituents and together with the hydrogen-containing recycle gas flow from phase separator 11 through line 13 to the lower part of reactor 14. The portion of the raw oil non-volatile at about 750° F. and the total and partial pressure conditions prevailing flows from phase separator 11 through line 15 to the suction side of pump 16 which discharges into line 17. The non-volatile portion of the raw oil flows through line 17 to the upper part of reactor 14. Pump 16 may be omitted by imposing a pressure drop in line 13 thereby forcing the non-volatile portion of the raw oil to flow under pressure to reactor 14.

In reactor 14 a bed or beds of desulfurizing catalyst is disposed in any suitable manner. While the use of a fixed bed or beds is illustrated, the use of moving bed or beds, or fluidized bed technique is not excluded.

Suitable desulfurizing catalysts for hydrodesulfurizing petroleum fractions are well known and include oxides and sulfides of the metals of the VI and VIII groups alone or in admixture with or without supports such as alumina, silica-alumina and the like. For the purpose of this illustration, a cobalt oxide-molybdenum oxide mixture supported by aluminum oxide is the catalyst.

The vapor phase material introduced into reactor 14 in the lower portion thereof flows upwardly countercurrent to the downwardly flowing liquid phase material introduced into the upper portion of the reactor through line 17. The vapor phase portion of the reactor feed, plus the lower boiling products produced in the treatment plus the recycle gas flow from the reactor through line 18 to the bottom of absorber-exchanger tower 19. The vapor phase portion of the reactor effluent can, if desirable, be heat-exchanged indirectly with hydrogen-rich recycle gas delivered from compressor 25 through line 31 as hereinbefore mentioned. The liquid phase material flows downwardly and leaves reactor 14 through line 20.

Liquid absorbent and heat transfer medium obtained as hereinafter described is pumped by pump 21 through line 22 to the upper portion of absorber and heat exchanger tower 19. The liquid absorbent and heat exchange medium flows downwardly through tower 19 countercurrent to the upwardly flowing reactor effluent gas phase. Intimate contact of the absorbent-heat transfer medium with the effluent gas phase results not only in cooling the effluent gas phase but also in the absorption of hydrocarbons of the gasoline boiling range. The hydrogen-rich gas leaves tower 19 at a temperature of below about 300° F. and preferably below about 150° F. having been cooled from reactor temperature. Simultaneously, the absorbent and heat transfer medium absorbs from the gas phase of the reactor effluent a significant portion of the vapor phase $C_4+$ hydrocarbons produced in the reactor 14, as well as those brought in with the reactor feed, and passing therefrom through line 18.

The stripped gas phase effluent leaves tower 19 through line 23 and flows through line 24 to the suction side of recycle gas compressor 25 under control of valve 30. A portion of the gas phase is vented to the refinery fuel system or to further processing through line 26 under control of valve 27. As required, hydrogen-containing gas from a source extraneous of the unit, such as a reforming unit, is drawn through line 28 under control of valve 29 and admixed with the cooled gas phase effluent in line 24. By means of valves 27 and 29 a mixture of cooled gas phase effluent and fresh hydrogen-containing gas is drawn from line 24 by recycle gas compressor 25 and pumped through line 31 to line 12 for admixture with fresh heated charge stock. As observed hereinbefore, the mixture of cooled reactor gas phase effluent and fresh hydrogen-containing gas can, when desired, be heat-exchanged indirectly with the vapor phase portion of the feed.

Returning to reactor 14, the liquid effluent of reactor 14 flows through line 20 to line 33. The heated, enriched absorbent heat transfer medium flowing downwardly in tower 19 flows therefrom through line 34 to line 33 where it mixes with the liquid phase effluent from reactor 14. For this reason, it is preferred to use treated distillate heating oil as the absorbent and heat transfer medium. Any other absorbent heat transfer medium can be used which is readily separated from the treated distillate heating oil, which will absorb light hydrocarbons under the conditions existing in tower 19 and release said light hydrocarbons in fractionator 35. Thus, a fraction of petroleum oil boiling above the end-point of distillate heating oil can be used and the treated distillate heating oil taken as a side stream from fractionator 35 rather than a bottoms product as illustrated.

The mixture of liquid phase effluent and absorbent and heat transfer medium (in the illustrated flowsheet the absorbent and heat transfer medium is treated distillate heating oil) flows through line 33 to fractionator 35. In fractionator 35 an overhead comprising hydrocarbons boiling below about 400° F. at atmospheric pressure is taken overhead through line 36. The overhead is cooled in condenser 37 to a temperature at which gasoline hydrocarbons are liquid. From condenser 37 the mixture of liquified overhead and uncondensed overhead flows through line 38 to accumulator 39. From accumulator 39 the uncondensed overhead flows through line 40 to the refinery fuel system or to further processing. The condensed overhead flows from accumulator 39 through line 41 to the suction side of pump 42 which discharges into line 43 through which the condensed overhead flows back to fractionator 35 for use as reflux therein. A portion of the condensed overhead flows from line 43 through line 44 under control of valve 45 to gasoline storage, further treatment catalytic or otherwise, addition of additives and the like.

The bottoms of fractionator 35, i.e., stripped treated distillate heating oil together with treated distillate heating oil used as absorbent and heat transfer medium in tower 19 flows from fractionator 35 through line 46 to the suction side of pump 47 which discharges into line 6. The liquid reactor effluent and the heat transfer medium from tower 19 will usually be at a temperature such that a separation of gasoline hydrocarbons and lighter can be made in fractionator 35. It is common practice to employ stripping steam to assist in the separation of gasoline and lighter as overhead and treated distillate heating oil as bottoms or as a side stream with a higher boiling absorbent and heat transfer medium taken as a bottoms. On the other hand, the desired separation can also be made by the application of reboiling heat to the material in the bottom of fractionator 35 either by direct firing or indirect heat transfer from a hot oil circuit, for example.

The hot, treated distillate heating oil flows through line 6 to heat exchanger 5 where the hot, treated distillate heating oil is in indirect heat exchange relation with the fresh, untreated distillate heating oil entering exchanger 5 through line 4 as described hereinbefore.

From exchanger 5 the treated distillate heating oil flows through line 48 to cooler 49 and thence to line 50. Part of the cooled treated distillate heating oil flows through line 51 under control of valve 52 to storage and/or further treatment, e.g., addition of additives. The balance flows through line 53 to the suction side of pump 21 for use as absorbent and heat transfer medium in tower 19 as described hereinbefore.

With a hydrogen recycle to reactor 14 of 4 mols per mole of distillate heating oil and about 40 percent by volume of the feed vaporized about 65 percent of the product make is used as absorbent and heat transfer medium in tower 19. With a hydrogen recycle to reactor 14 of about 2 mols of hydrogen per mol of distillate treating oil and about 10 volume percent of the feed vaporized, the amount of treated product recycled to tower 19 as absorbent and heat transfer medium is about 35 percent of the product make.

I claim:

1. In the upgrading of a hydrocarbon mixture wherein a hydrocarbon mixture to be up-graded, hereinafter designated hydrocarbon feed, is warmed as hereinafter described and then in a feed furnace heated to elevated reaction temperature, wherein in a reaction zone at elevated reaction temperature and pressure said hydrocarbon feed and hydrogen-containing gas are contacted with particle-form solid catalytic material having hydrogenating capabilities, wherein in the aforesaid reaction zone at reaction temperature and pressure a portion of said hydrocarbon feed is in the vapor phase and the balance of said hydrocarbon feed is in the liquid phase, wherein the reaction zone effluent of the aforesaid reaction zone is a mixed phase reaction zone effluent consisting of a vapor phase comprising hydrocarbons and hydrogen, and a liquid phase comprising hydrocarbons, wherein said mixed phase reaction zone effluent is brought into indirect heat exchange relation with hydrocarbon feed to warm said hydrocarbon feed, wherein the aforesaid mixed phase reaction zone effluent thereafter is cooled by indirect heat exchange to condense valuable hydrocarbons and to produce hydrogen-containing recycle gas at a pressure less than the aforesaid elevated reaction pressure, wherein said recycle gas is recompressed to at least the aforesaid reaction pressure and recycled to the aforesaid reaction zone, and wherein at least a portion of the liquid phase of said mixed phase reaction zone effluent is recovered as a process product, the improvement which comprises separating said mixed phase reaction zone effluent at substantially reaction temperature and pressure into a reaction zone vapor phase effluent comprising hydrogen and hydrocarbons vaporous at said reaction temperature and pressure and a reaction zone liquid phase effluent comprising hydrocarbons liquid at said reaction zone temperature and pressure, in a direct heat exchange zone at substantially reaction temperature and pressure contacting said reaction zone vapor phase effluent with liquid heat transfer medium and absorbent consisting essentially of hydrocarbons to absorb hydrocarbons from said reaction zone vapor phase effluent in said heat transfer medium and to provide a recycle gas having a higher concentration of hydrogen than the reaction zone vapor phase effluent to cool said recycle gas, and to heat said liquid transfer medium by direct heat transfer from said reaction zone vapor phase effluent, withdrawing from said direct heat exchange zone cooled recycle gas having a temperature below 300° F., recompressing said cooled recycle gas to at least reaction pressure and recycling said recycle gas to said reaction zone, mixing said heated liquid transfer medium with the aforesaid reaction zone liquid phase effluent having substantially the aforesaid reaction temperature to obtain a hot fractionable liquid mixture, without further substantial heating fractionating said fractionable liquid mixture to obtain at least an overhead and a liquid bottoms, in an indirect heat exchange zone transferring heat from at least a portion of said liquid bottoms to fresh hydrocarbon feed, to cool said portion of said bottoms and to warm said fresh hydrocarbon feed, recycling said cooled portion of said liquid bottoms to said direct heat exchange zone, and flowing said warm fresh hydrocarbon feed to said feed furnace.

2. The method as set forth and described in claim 1 wherein the hydrocarbon feed and hydrogen-containing gas are mixed in a mixing zone at reaction temperature and pressure, wherein the resulting mixture is separated into a vaporous feed phase comprising hydrogen and hydrocarbons vaporized at said reaction temperature and pressure, and a liquid feed phase comprising hydrocarbons liquid at said reaction temperature and pressure, wherein said liquid phase flows downwardly through said reaction zone and said vaporous feed phase flows upwardly through said reaction zone, wherein the reaction zone vaporous effluent is withdrawn separately from the reaction zone liquid effluent, and wherein the cooled recycle gas is recycled to the aforesaid mixing zone.

3. The method as set forth and described in claim 1 wherein the hydrocarbon feed is an oil boiling in the distillate heating oil range, wherein the hydrocarbon feed and hydrogen-containing gas are mixed in a mixing zone at reaction temperature and pressure, wherein the resulting mixture is separated into a vaporous feed phase comprising hydrogen and hydrocarbons vaporized at said reaction temperature and pressure and a liquid feed phase comprising hydrocarbons liquid at said reaction temperature and pressure, wherein said liquid feed phase flows downwardly through said reaction zone and said vaporous feed phase flows upwardly through said reaction zone, wherein the reaction zone vaporous effluent is withdrawn from said reaction zone separately from the reaction zone liquid effluent, wherein the cooled recycle gas is recycled to the aforesaid mixing zone, and wherein upgrade oil boiling in the distillate heating oil range is a process product.

4. The method as set forth and described in claim 1 wherein the hydrocarbon feed is an oil boiling in the distillate heating oil range, wherein the hydrocarbon feed and hydrogen-containing gas are mixed in a mixing zone at reaction temperature and pressure, wherein the resulting mixture is separated into a vaporous feed phase comprising hydrogen and hydrocarbons vaporized at said reaction temperature and pressure and a liquid feed phase comprising hydrocarbons liquid at said reaction temperature and pressure, wherein said liquid feed phase flows downwardly through said reaction zone and said vaporous feed phase flows upwardly through said reaction zone, wherein the reaction zone vaporous effluent is withdrawn from said reaction zone separately from the reaction zone liquid effluent, wherein the liquid heat transfer medium and absorbent is liquid upgraded oil boiling in the distillate heating oil range.

References Cited in the file of this patent

UNITED STATES PATENTS

| | | |
|---|---|---|
| 2,608,521 | Hoog | Aug. 26, 1952 |
| 2,642,381 | Dickinson | June 16, 1953 |
| 2,834,718 | Stanford et al. | May 13, 1958 |